B. A. BEHREND.
DYNAMO ELECTRIC MACHINE.
APPLICATION FILED AUG. 21, 1905.
1,028,985.
Patented June 11, 1912.
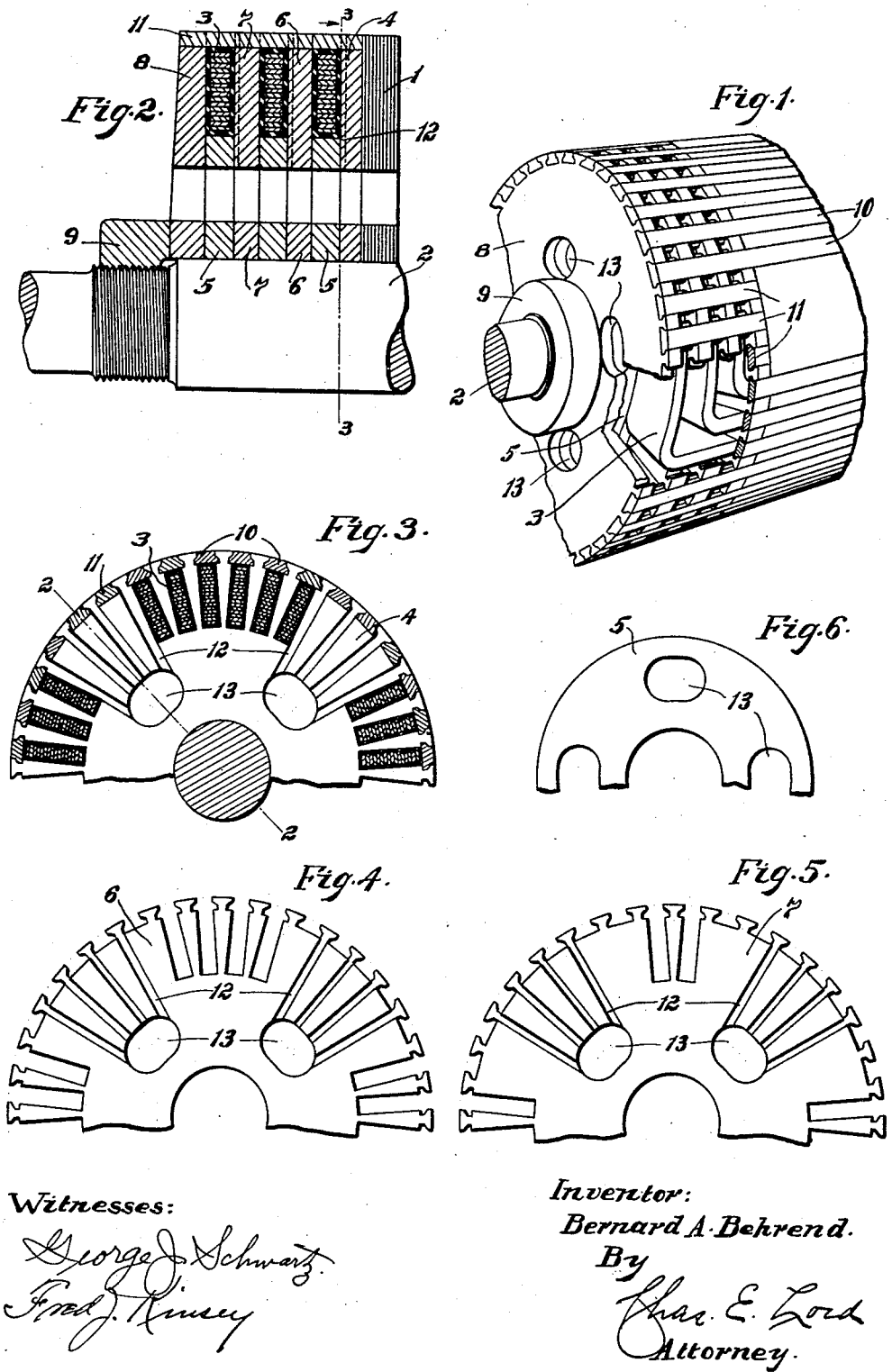
Witnesses:
George J. Schwartz
Fred J. Kinsey
Inventor:
Bernard A. Behrend.
By
Chas. E. Lord
Attorney.

UNITED STATES PATENT OFFICE.

BERNARD ARTHUR BEHREND, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-ELECTRIC MACHINE.

1,028,985.     Specification of Letters Patent.     Patented June 11, 1912.

Application filed August 21, 1905. Serial No. 275,119.

*To all whom it may concern:*

Be it known that I, BERNARD A. BEHREND, citizen of the United States, residing at Norwood, in the county of Hamilton and State of Ohio, have invented certain new and useful Improvements in Dynamo-Electric Machines, of which the following is a full, clear, and exact specification.

My invention relates to dynamo-electric machines and particularly to the means for supporting and retaining the coils on the rotatable element of a high speed machine of the type shown in the patent to Pomeroy and myself No. 780,085 July 17, 1905.

The object of my invention is to provide a support and retainer for coil end turns on the rotatable element of a machine, particularly a high speed machine, which will be simple, easy to assemble, and still very effective in resisting strains due to centrifugal force at high speeds.

In carrying out my invention, I support the end turns of the coils of a dynamo-electric machine element by means of a plurality of members extending outward from the core of the element.

My invention further consists of a dynamo-electric machine having a rotatable element comprising a core, windings thereon having end turns or connections, an end cover for said windings, and retaining elements extending over said end turns from said end cover to said core.

More specifically considered my invention consists in supporting the end turns of the coils of the rotatable element of a dynamo-electric machine on disks of less diameter than the laminæ of the core and in retaining the coils in place by wedges which may be either extensions of the ordinary coil retaining wedges which fit into undercut grooves in the slots of the core, or may be short wedges extending from the core to an end head beyond the end turns.

My invention further consists of the combination of elements more fully described in the specification and set forth in the accompanying claims.

My invention will be more fully understood by referring to the accompanying drawings, in which—

Figure 1 is a perspective of a portion of a rotatable field magnet, parts being broken away for the sake of clearness; Fig. 2 is a partial sectional elevation along the line 2—2 of Fig. 3; Fig. 3 is a sectional elevation with parts removed, along the line 3—3 of Fig. 2 looking in the direction of the arrow; Figs. 4 and 5 are elevations with portions removed of two of the separating plates for the end turns; Fig. 6 is a partial elevation of one of the disks for supporting the end turns.

The core is composed of laminæ 1 assembled on the shaft 2. The outline of the laminæ is indicated substantially in Fig. 3, the core being of the slotted, four-pole type. In the present instance the core represents a rotatable field magnet, the winding 3 being of the distributed type having its coils connected in series to form alternately north and south poles, there being in this instance three coils per pole. The coils consist of a number of turns of flat copper strips, and are inserted in the slots which are undercut to receive the coil retaining wedges.

The laminæ are held between thick disks or end heads, one of which is shown at 4. These end heads have the same number of slots to receive the coils as have the laminæ, having in this instance as indicated in Fig. 3, 24 slots. The end turns of the coils which extend beyond the core are supported on disks 5 of less diameter than the laminæ, the outer peripheries of these disks being flush with the bottoms of the slots of the laminæ and plates 4. The end turns are spaced apart by the separating disks 6 and 7 of the same diameters as the laminæ. The separating disk 6 between the inner and middle coil, has two less slots per pole than the laminæ. This separating disk is shown in Fig. 4. The separating disk 7, shown in Fig. 5, has only two slots per pole for the outer coil. Mounted on the shaft at the extremities of the coils are the protecting end plates or covers 8 which are held in position by the tightening nuts 9, by means of which all parts of the rotor including laminæ, coils, supporting disks, spacing disks, and end plates are held tightly together. The coils are carefully insulated from the laminæ, supporting disks, and spacing plates, as is shown in Fig. 2. The supporting disks are of substantially the same thickness as the insulated coils in order that all parts may be held tightly together and the pressure of the spacing plates evenly distributed. The plates supporting and separating the portions of the coils extending beyond the laminæ may be of any desired material. The supporting and separating members 4, 5 6, and 7 are shown as solid disks, but if desired each of these members may be built up of bundles of laminæ riveted or otherwise held together. In the latter case the coils would be embedded entirely in a laminated core which would extend from end plate to end plate.

The slots in the laminated portion are undercut in the ordinary manner to retain the coils in place. The most important feature of my invention is my means for retaining the end turns of the coils securely in place. Instead of surrounding the portions of the coils which extend beyond the core with heavy steel collars as is shown in the patent previously referred to, I retain the coils in place by wedges. The wedges fit into undercut grooves in the plates 4, 6, 7, and 8 and are arranged at regular intervals around the rotor at each end. In Fig. 1 the long coil retaining wedges are extended to reach entirely across the rotor, and serve to retain the end turns in place as is shown at 10. Opposite the faces of the solid poles short wedges 11 extend from plate 4 to plate 8. If desired the short wedges alone may be employed for holding the end turns in place. The wedges may be of any material, preferably of nonmagnetic material, as phosphor-bronze.

It is seen that my rotor is well balanced, and all parts are held firmly together and there is no danger of rupture caused by centrifugal action at high speeds. Also the parts can be easily assembled and taken apart for repairs. Between the wedges the coils are exposed and therefore good ventilation is afforded. If desired ventilating spaces may be formed about the coils by slotting or corrugating the various disks, as shown at 12 in Figs. 2, 3, 4, and 5. These slots extend radially from ventilating passageways 13, in the disks to the outer peripheries of the disks. The supporting disks 5 and end plates 8 are likewise provided with ventilating holes or passageways 13, which when the parts are assembled aline with the passageways in the spacing disks so that when the machine is in operation there will be a good circulation of air around the end turns. The core of the machine may be provided with any suitable ventilating passageways.

My invention is applicable not only to the rotary field types of machine as shown, but may be utilized in any type of machine either for the rotating or stationary parts.

Having thus described my invention, what I claim as new and desire to secure by Letters Patent is—

1. In a dynamo-electric machine, a core, coils thereon, an end plate at the extremities of the coils, and means for holding the end turns in place comprising a plurality of members extending from the end plate to and terminating at the core.

2. In a dynamo-electric machine, a rotatable element comprising a core, windings thereon having end turns or connections, an end cover or plate for the end turns, said core and end plate having opposite corresponding slots or openings, and coil retaining elements extending across the end turns from the end plate to and terminating at the core, said elements being secured in said slots or openings.

3. In a dynamo-electric machine, a rotatable element, comprising a core, windings carried thereby and having end turns or connections, end plates for said windings, undercut slots in the periphery of said plates, and coil retaining elements extending only across the end turns and fitting in the slots of the end plates.

4. In a dynamo-electric machine, a rotatable member comprising a slotted core, windings in said slots having end turns or connections, an end plate or cover for said end turns, said end plate having openings corresponding to said core slots, and means for retaining said windings in place located in said plate and extending only over said end turns.

5. In a dynamo-electric machine, a rotatable element comprising a slotted core, coils in said slots having end turns, end covers for said end turns, wedges in the core slots for retaining the coils in place, and wedges extending only between the end covers and the core for holding the end turns in place.

6. In a dynamo-electric machine, a rotatable element comprising a slotted core, a distributed winding in said slots having end turns or connections, means including slotted spacing plates between the end turns for supporting said end turns, an end cover or disk for the end turns, long wedges fitted in the slots of the core and retaining the windings in place, and short wedges extending from the end cover to the core and fitting in the slots of the end cover and spacing plates to retain the end turns in place.

7. In a rotatable element of a dynamo-electric machine having axial ventilating passageways, a core, coils having end turns and carried by said core, wedges for retaining the coils in place, said wedges extending only over the end turns and forming spaces, said element having ventilating passageways communicating with the axial passageways and the spaces between the wedges.

8. In a rotatable element of a dynamo-electric machine, having an axial ventilating passageway, a core, coils having end-turns and carried by said core, wedges for retaining the coils in place, said wedges extending only over the end-turn, said element having ventilating passageways communicating with the axial passageway.

9. In a dynamo-electric machine, a rotatable member comprising a slotted core, windings in said slots and having end turns, an end cover, and means for retaining said windings in place, said means being located in said end cover and extending only over said end turns.

10. In a dynamo-electric machine, a rotatable member comprising a slotted core, windings in said slots and having end turns, an end cover, and wedges for retaining said windings in place, said wedges being located in said cover and extending only over said end turns.

11. In a dynamo-electric machine, a rotatable member comprising a slotted core, windings in said slots and having end turns, an end head and an end cover on the same end of said rotating member and between which said end turns are located, and means coöperating with said end head and end cover and extending only over said end turns for supporting the latter.

12. In a dynamo-electric machine, a rotatable member comprising a slotted core, windings in said slots and having end turns, an end head and an end cover on the same end of said rotating member and between which said end turns are located, and wedges coöperating with said end head and end cover and extending only over said end turns for supporting the latter.

In testimony whereof I affix my signature, in the presence of two witnesses.

BERNARD ARTHUR BEHREND.

Witnesses:
SANFORD KLEIN,
FRED. J. KINSEY.

Copies of this patent may be obtained for five cents each, by addressing the "Commissioner of Patents, Washington, D. C."